United States Patent Office 3,393,792
Patented July 23, 1968

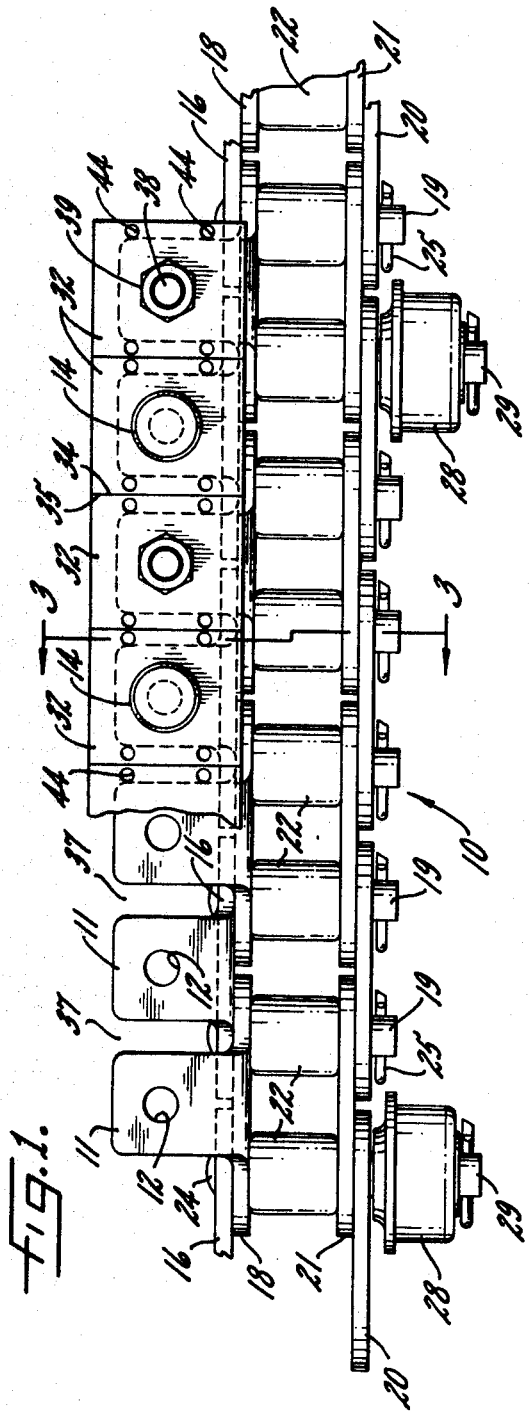

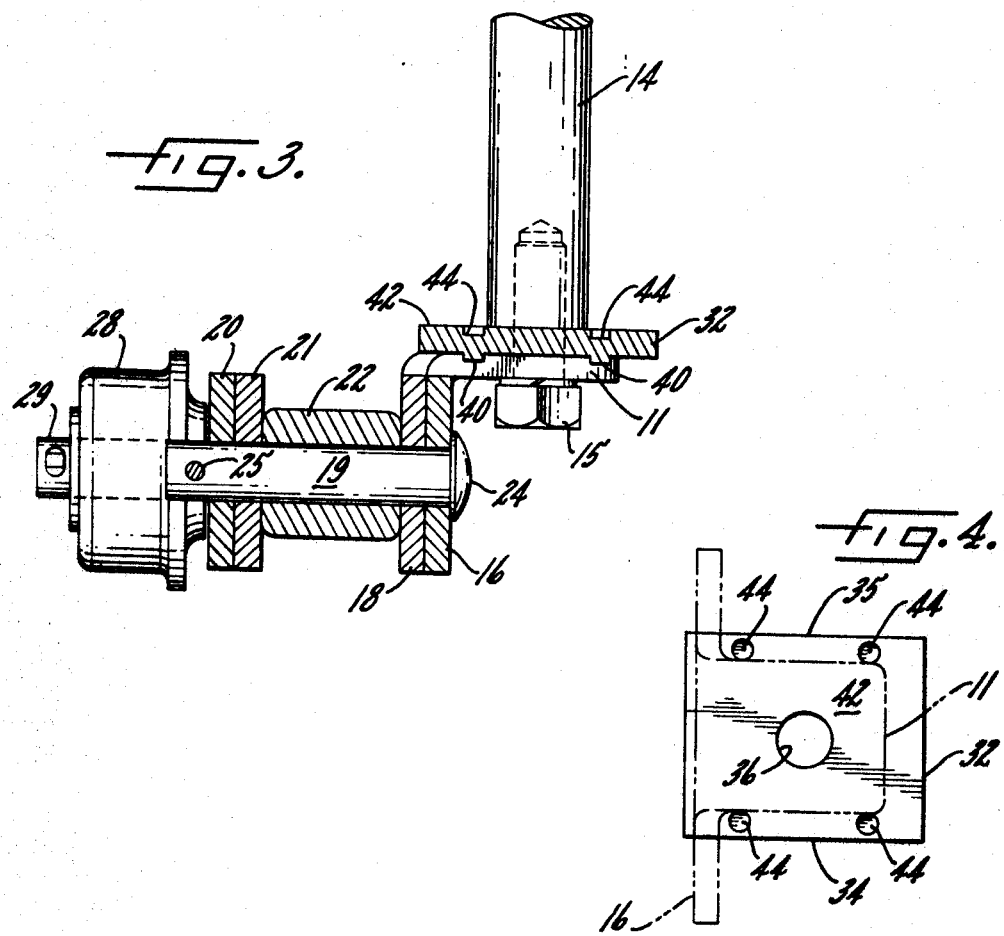

3,393,792
SELF-SUPPORTING CONVEYOR CHAIN
Arthur W. Virta, Mount Prospect, Ill., assignor to Aircraft Products Co., Chicago, Ill., a corporation of Illinois
Filed Dec. 19, 1966, Ser. No. 602,851
4 Claims. (Cl. 198—189)

ABSTRACT OF THE DISCLOSURE

A chain link assembly, capable of stiffening and making self-supporting horizontal runs of the chain, in which stiffener plates are secured to lugs on the chain links with the plates being proportioned to come into edge abutting relationship when the chain is horizontal. The plates are formed to lock against rotation on the lugs when secured by a single bolt.

---

This invention relates generally to conveyor chain and more particularly concerns modifying such chain so that it is self-supporting.

Conveyor chain is often called upon to move in a generally horizontal direction without sagging. To avoid the expense of support rails or the like, special chain has been proposed in which the links fold or pivot only one way, hence making the chain self-supporting against sag. Heretofore, such self-supporting chain, because it is "special," has been more expensive and less readily available for installation and repair than the more conventional conveyor chain.

Accordingly, it is the primary aim of the invention to provide a self-supporting chain construction by simply and economically modifying a standard bent lug conveyor chain. Moreover, it is an object to accomplish the modification without disassembling the chain, or altering or replacing the standard chain parts.

In more detail, it is an object of the invention to provide simple, easily formed stiffener plates adapted to be readily secured to a bent lug conveyor chain to produce a self-supporting antisag chain.

Other objects and advantages of the invention will be apparent upon reading the following detailed description taken in connection with the drawings, in which:

FIGURE 1 is a plan view of a standard chain having bent lugs equipped with stiffener plates for carrying out the invention;

FIG. 2 is a side elevational view of the chain of FIG. 1;

FIG. 3 is a sectional view taken substantially along the line 3—3 of FIG. 1 showing a post attached to a chain stiffener plate and bent lug attachment; and FIG. 4 is a plan view of a single stiffener plate showing its ends overhanging the bent lug.

While the invention has been shown and will be described in some detail with reference to a particular embodiment thereof, there is no intention that it thus be limited to such detail. On the contrary, it is intended here to cover all alterations, modifications and equivalents falling within the spirit and scope of the invention as defined by the appended claims.

Referring now to Figs. 1 and 2, the invention is shown in conjunction with a portion of a conveyor chain of standard construction which may be purchased commercially. The present invention is particularly concerned with stiffening a standard chain construction 10 commonly used for conveyors in which the chain side plates along one side of the chain are each equipped with a bent lug 11, which is commonly termed a bent lug attachment, and which extends transversely of the longitudinal movement of the chain. The bent lugs are centrally apertured at 12 to receive a fastener connection to a conveyor post or pan, and several posts 14 are shown (FIG. 2) secured by bolts 15 to several of the bent lugs.

Herein, the bent lugs 11 are formed by bending horizontally an integral upper portion of generally vertical side plates 16 and 18 disposed along one side of the chain. These side plates 16 and 18 constitute the usual inner and outer side plates of a chain with the inner side plates alined longitudinally and spaced from each other and with the outer side plates similarly alined longitudinally and abutted against the inner side plates. As in the usual chain construction, the ends of the inner side plates are apertured, and the outer side plates overlap the ends of the inner side plates and extend across the longitudinal space between adjacent inner side plates. The ends of the outer side plates also are apertured and alined with the apertures in the ends of the inner side plates and a horizontal pin 19 is inserted transversely of and through the apertures of the inner and outer links. The pins extend horizontally and are inserted through alined apertures in inner and outer side plates 20 and 21 arranged in a manner similar to the side plates 16 and 18. The side plates 20 and 21, however, do not have a bent lug at their upper ends.

Journalled on each of the pins between the inner side plates 18 and 21 is a roller or bushing 22 for spacing the side plates and cooperating with the toothed sprocket wheels at the end of the conveyor run. The bushings and side plates are held together in assembled relation with the pins by an enlarged pin head 24 engaging the outer side plates 16 at one side of the chain and by a cotter key 25 inserted through an aperture in the end of the pin and engaging the outer side plate 20 at the other side of the chain.

In the particular construction of the chain 10 described herein, the chain is supported for horizontal movement by rollers 28 which are mounted on longitudinally spaced pins 29 which are similar to the pins 19 but elongated to receive the rollers. The rollers extend outwardly of the chain on the opposite side of the chain from the bent lugs and are disposed to roll along a horizontal track (not shown) to guide the chain in its movement.

In accordance with the present invention, the chain 10 is stiffened against sagging downwardly from a generally horizontal plane by simple stiffener plates 32 secured to each of the bent lugs 11 with the respective edges of the plates at side walls 34 and 35 being in edge abutting relationship with one another. More particularly, the stiffener plates are sized to extend across the bent lugs and into edge abutting relationship with one another at their respective adjacent side walls when the bent lugs are disposed in a generally horizontal plane and, therefore, the abutted side walls 34, 35 prevent pivoting of adjacent bent lugs towards one another to narrow a gap 37 therebetween.

More specifically, the stiffener plates 32 extend longitudinally of the chain and across the bent lugs 11 to close the gap 37 between adjacent bent lugs when the stiffener plates are horizontally disposed and engaged at their respective side walls 34 and 35. The longitudinal width of the stiffener plates between the side walls 34 and 35 is substantially equal to the spacing between the apertures 12 and the bent lugs 11.

Herein, the stiffener plates 32 are small rectangular plates of flat sheet metal having a central bolt receiving aperture 36 (FIG. 4) to receive a bolt 38 (FIG. 2) extending vertically through the apertures in the bent lug and stiffener plate. A nut 39 is threaded on the bolt to secure the stiffener plate to the bent lug and the nut may be unthreaded to permit removal of the stiffener plate from the bent lug when the chain is worn.

In this exemplary embodiment, the apertures 36 in the stiffener plates are identical in size to the apertures 12 in the bent lugs to receive the shank of the bolts 15 which secure the supporting posts 14 to the bent lugs. The support posts may be connected to a cross bar (not shown) which serves as a support for the article being conveyed between the chain shown and another chain of similar construction. Also a conveyor pan or the like could be directly connected to the bent lug attachment by suitable bolts, rivets or the like extending through the alined apertures in the plates and lugs. Therefore, it will be seen that the bent lug chain 10 can be used in any standard or desired manner with no interference from the added plates 32.

An important aspect of the present invention is to prevent the twisting of the stiffener plates on the bent lugs because of the forces involved being at an angle to the normal. For this purpose each of the plates 32 has a configuration to embrace the sides of the bent lugs. In the illustrated form, the stiffener plates are afforded with spaced pairs of projections 40 and 41 which are integrally struck from the flat sheet metal piece to extend downwardly at four spaced points. The upper surface 42 of the plate shows four small indentations 44 formed during the striking operation. The pairs of projections 40 and 41 are spaced horizontally apart a distance to fit against the opposite sides of a bent lug with the aperture 36 centered with the aperture in the bent lug. Preferably, the projections are formed and the aperture 36 is punched in a single punching operation to assure accuracy and a low cost manner of forming plates.

The stiffener plates 32 are secured to the upper sides of the bent lugs rather than the undersides of the bent lugs in order to increase the lever arm distance through which the stiffener plate is resisting chain sag. It can be seen that the further the forces acting on the side walls 34 and 35 are from the pivot points at the axes of the pins 19, the greater is the resistance to sagging.

From the foregoing it will be seen that the present invention affords an inexpensive and simple manner of stiffening a chain of standard construction by detachably securing stiffener plates to the bent lugs of the chain, with the stiffener plates abutting one another at adjacent side walls. The stiffener plate construction disclosed is particularly inexpensive and does not interfere with normal chain use.

I claim as my invention:

1. The combination comprising a plurality of chain links connected to extend longitudinally, a bent lug on each of said chain links extending transversely of the connected chain links, and a plurality of stiffener plates each detachably secured to a bent lug, said plates having overhanging ends extending longitudinally from their associated bent lugs into edge abutting relationship with the overhanging ends of stiffener plates on the opposite sides thereof so that the chain links are held against pivoting downwardly by the abutted edges of the stiffener plates.

2. The combination of claim 1 in which said bent lugs are centrally apertured and in which said stiffener plates are centrally apertured, and including bolts for extending through the alined central apertures on a stiffener plate and lug to bolt the same together.

3. The combination of claim 1 in which each of said stiffener plates is a flat plate having downwardly struck projections spaced longitudinally to embrace the sides of the associated lug.

4. In a flexible conveyor chain stiffened against sagging downwardly along a horizontal run, the combination comprising, inner and outer vertical side plates extending longitudinally of the chain and abutted against each other and forming one side of the chain, inner and outer vertical side plates extending longitudinally of the chain and abutted against each other and forming the other side of the chain, each of said inner side plates on one side of the chain being alined transversely with an inner side plate on the opposite side of the chain, each of said outer side plates on one side of the chain being alined transversely with an outer side plate on the opposite side of the chain, the ends of each of said inner and outer side plates being apertured, horizontally extending pins extending through a pair of inner and outer side plates at each side of the plate, a bent lug on each of said inner and outer side plates on one side of the chain extending normal to its respective side plate, said lugs being spaced vertically from said pins, and a plurality of stiffener plates each detachably secured to a bent lug and extending longitudinally of and beyond the sides of the bent lug, the opposite vertical side walls on each stiffener plate engaging an adjacent side wall of an adjacent stiffener plate, when the stiffener plates are in a horizontal disposition along the horizontal run, to prevent downward movement of side plates and pins from the horizontal.

References Cited

UNITED STATES PATENTS 2,936,806   5/1960   Harper _____ 151—41.7

EDWARD A. SROKA, *Primary Examiner.*